United States Patent
Liu et al.

(10) Patent No.: US 12,528,194 B2
(45) Date of Patent: Jan. 20, 2026

(54) COORDINATE SYSTEM CALIBRATION METHOD, APPARATUS AND SYSTEM FOR ROBOT, AND MEDIUM

(71) Applicant: BEIJING JINGDONG QIANSHI TECHNOLOGY CO., LTD., Beijing (CN)

(72) Inventors: Weifeng Liu, Beijing (CN); Xu Liu, Beijing (CN); Yunjian Cheng, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 130 days.

(21) Appl. No.: 18/701,461

(22) PCT Filed: Oct. 11, 2022

(86) PCT No.: PCT/CN2022/124678
§ 371 (c)(1),
(2) Date: Apr. 15, 2024

(87) PCT Pub. No.: WO2023/134237
PCT Pub. Date: Jul. 20, 2023

(65) Prior Publication Data
US 2025/0229428 A1    Jul. 17, 2025

(30) Foreign Application Priority Data
Jan. 14, 2022 (CN) .......................... 202210041859.1

(51) Int. Cl.
*B25J 9/16* (2006.01)
(52) U.S. Cl.
CPC .................................. *B25J 9/1692* (2013.01)

(58) Field of Classification Search
CPC . B25J 9/1692; B25J 9/16; G05B 2219/39022; G05B 2219/39024; G05B 2219/39046; G05B 2219/39419
See application file for complete search history.

(56) References Cited

U.S. PATENT DOCUMENTS

2011/0320039 A1* 12/2011 Hsu ........................ B25J 9/1692
                                                           700/254
2016/0184995 A1*  6/2016 Uchiyama ............. B25J 9/1692
                                                           700/259

FOREIGN PATENT DOCUMENTS

| CN | 105729467 A | 7/2016 |
| CN | 106335061 A | 1/2017 |

(Continued)

OTHER PUBLICATIONS

Communication pursuant to Rule 164(1) EPC with Supplementary Partial European Search Report, EP Application No. 22919871.8, Jun. 18, 2025, 19 pp.

(Continued)

*Primary Examiner* — Basil T. Jos
(74) *Attorney, Agent, or Firm* — Myers Bigel, P.A.

(57) ABSTRACT

The present disclosure provides a coordinate system calibration method, apparatus and system for a robot, and a storage medium, wherein the method includes controlling an execution component of a robot to perform translation movement, and acquiring first coordinate information of the execution component, and second coordinate information which is collected by a photographic apparatus regarding a calibration board, so as to determine a rotation matrix; and controlling the execution component to perform rotatory movement, and acquiring third coordinate information which is collected by the photographic apparatus regarding the calibration board, so as to determine a translation matrix.

20 Claims, 5 Drawing Sheets

(56) References Cited

FOREIGN PATENT DOCUMENTS

| CN | 108818536 A | 11/2018 |
|---|---|---|
| CN | 109658460 A | 4/2019 |
| CN | 110276806 A | 9/2019 |
| CN | 110842914 A | 2/2020 |
| CN | 111775152 A | 10/2020 |
| CN | 112091971 A | 12/2020 |
| CN | 113442169 A | 9/2021 |
| CN | 113843792 A | 12/2021 |
| CN | 114310901 A | 4/2022 |
| DE | 102007058293 A1 | 6/2009 |
| JP | 2010172986 A | 8/2010 |

OTHER PUBLICATIONS

"First Office Action and English language translation", CN Application No. 202210041859.1, Apr. 26, 2023, 11 pp.

"International Search Report and English language translation", International Application No. PCT/CN2022/124678, Jan. 4, 2023, 5 pp.

\* cited by examiner

COORDINATE SYSTEM CALIBRATION METHOD, APPARATUS AND SYSTEM FOR ROBOT, AND MEDIUM

CROSS-REFERENCE TO RELATED APPLICATIONS

This application is a U.S. National Stage Application under 35 U.S.C. § 371 of International Patent Application No. PCT/CN2022/124678, filed on Oct. 11, 2022, which itself is based on and claims priority to Chinese Patent Application No. CN202210041859.1 filed on Jan. 14, 2022, the disclosures of both of which are incorporated by reference herein in their entireties.

TECHNICAL FIELD

The present disclosure relates to the field of robot technology, and in particular, to a coordinate system calibration method, apparatus and system for a robot, and a storage medium.

BACKGROUND

Vision guiding a robot to operate is a common application of intelligent warehousing automation, used in scenarios such as picking small goods into a box, de-palletizing and palletizing medium goods, and de-consolidating goods. The vision guiding a robot needs to calibrate a relationship between a camera coordinate system and a world coordinate system, and transform a target picking pose outputted by a vision system into one in the world coordinate system, so as to guide the robot to operate.

SUMMARY

According to a first aspect of the present disclosure, there is provided a coordinate system calibration method for a robot, comprising: controlling an execution component of the robot to perform translation movement, and acquiring first coordinate information of the execution component which corresponds to the translation movement, wherein the robot is a four-degree-of-freedom robot, and the first coordinate information is coordinate information in a world coordinate system; acquiring second coordinate information which is collected by a photographic apparatus of the robot regarding a calibration board, wherein the calibration board is parallel to a corresponding coordinate plane of the world coordinate system, and the second coordinate information is coordinate information in a camera coordinate system; determining a rotation matrix on the basis of the first coordinate information and the second coordinate information; controlling the execution component to perform rotatory movement, and acquiring third coordinate information which is collected by the photographic apparatus regarding the calibration board, wherein the third coordinate information is coordinate information in the camera coordinate system; according to a position relation between the calibration board and the execution component, determining a deviation vector between the calibration board and the execution component; and determining a translation matrix on the basis of the first coordinate information, the deviation vector, the rotation matrix, and the third coordinate information.

In some embodiments, the determining a translation matrix on the basis of the first coordinate information, the deviation vector, the rotation matrix, and the third coordinate information comprises: calculating a translation deviation on the basis of the rotation matrix and the third coordinate information; and according to the first coordinate information, the deviation vector, and the translation deviation, determining the translation matrix.

In some embodiments, the calculating a translation deviation on the basis of the rotation matrix and the third coordinate information comprises: calculating a product of the rotation matrix and the third coordinate information as the translation deviation; and the according to the first coordinate information, the deviation vector, and the translation deviation, determining the translation matrix comprises: determining coordinate information of the calibration board on the basis of a sum of the first coordinate information and the deviation vector; and according to a difference between the coordinate information of the calibration board and the translation deviation, determining the translation matrix.

In some embodiments, the according to a position relation between the calibration board and the execution component, determining a deviation vector between the calibration board and the execution component comprises: acquiring a perpendicular distance between the calibration board and the corresponding coordinate plane of the world coordinate system; and constructing the deviation vector on the basis of the perpendicular distance and direction information of an axis of the world coordinate system.

In some embodiments, the determining a rotation matrix on the basis of the first coordinate information and the second coordinate information comprises: constructing a first translation matrix corresponding to the world coordinate system on the basis of the first coordinate information; constructing a second translation matrix corresponding to the camera coordinate system on the basis of the second coordinate information; and according to the first translation matrix and the second translation matrix, determining the rotation matrix.

In some embodiments, the according to the first translation matrix and the second translation matrix, determining the rotation matrix comprises: performing three-dimensional affine transformation processing on the basis of the first translation matrix and the second translation matrix, so as to determine the rotation matrix.

In some embodiments, the acquiring second coordinate information which is collected by a photographic apparatus of the robot regarding a calibration board comprises: determining a reference point on the calibration board; and acquiring second coordinate information which is collected by the photographic apparatus regarding the reference point.

According to a second aspect of the present disclosure, there is provided a coordinate system calibration apparatus for a robot, comprising: a processor; and a memory coupled to the processor, storing program instructions which, when executed by the processor, cause the processor to: control an execution component of the robot to perform translation movement, and acquire first coordinate information of the execution component which corresponds to the translation movement, wherein the robot is a four-degree-of-freedom robot, and the first coordinate information is coordinate information in a world coordinate system; acquire second coordinate information which is collected by a photographic apparatus of the robot regarding a calibration board, wherein the calibration board is parallel to a corresponding coordinate plane of the world coordinate system, and the second coordinate information is coordinate information in a camera coordinate system; determine a rotation matrix on the basis of the first coordinate information and the second coordinate information; control the execution component to perform rotatory movement, and acquire third coordinate information which is collected by the photographic apparatus regarding the calibration board, wherein the third coordinate information is coordinate information in the camera coordinate system; determine a deviation vector between the calibration board and the execution component according to a position relation between the calibration board and the execution component; and determine a translation matrix on the basis of the first coordinate information, the deviation vector, the rotation matrix, and the third coordinate information.

According to a third aspect of the present disclosure, there is provided a coordinate system calibration system, comprising: a calibration board, and the coordinate system calibration apparatus for a robot as described above.

According to a fourth aspect of the present disclosure, there is provided a computer-readable storage medium, having thereon stored computer instructions which, when executed by the processor, cause the processor to: control an execution component of the robot to perform translation movement, and acquire coordinate information of the execution component which corresponds to the translation movement, wherein the robot is a four-degree-of-freedom robot, and the first coordinate information is coordinate information in a world coordinate system; acquire second coordinate information which is collected by a photographic apparatus of the robot regarding a calibration board, wherein the calibration board is parallel to a corresponding coordinate plane of the world coordinate system, and the second coordinate information is coordinate information in a camera coordinate system; determine a rotation matrix on the basis of the first coordinate information and the second coordinate information; control the execution component to perform rotatory movement, and acquire third coordinate information which is collected by the photographic apparatus regarding the calibration board, wherein the third coordinate information is coordinate information in the camera coordinate system; determine a deviation vector between the calibration board and the execution component according to a position relation between the calibration board and the execution component; and determine a translation matrix on the basis of the first coordinate information, the deviation vector, the rotation matrix, and the third coordinate information.

BRIEF DESCRIPTION OF THE DRAWINGS

In order to more clearly illustrate the embodiments of the present disclosure or technical solutions in related art, the drawings that need to be used in the description of the embodiments or related art will be briefly described below; it is obvious that the drawings in the following description are only some embodiments of the present disclosure, and for one of ordinary skill in the art, other drawings may be obtained according to the drawings without paying creative labor.

DETAILED DESCRIPTION

Figure 1:
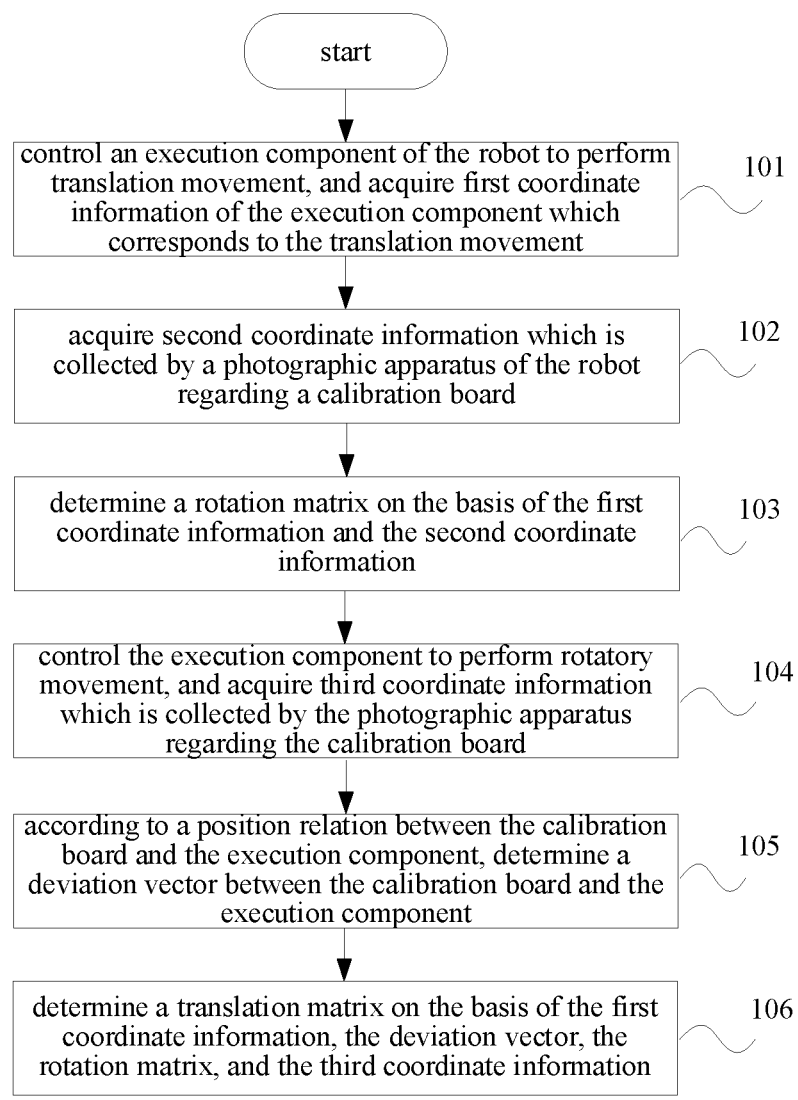
FIG. 1 is a schematic flow diagram of some embodiments of a coordinate system calibration method for a robot according to the present disclosure.

With reference to the accompanying drawings, the more comprehensive description of the present disclosure will be made below, in which exemplary embodiments of the present disclosure are illustrated. The technical solutions in the embodiments of the present disclosure will be clearly and completely described below in conjunction with the drawings in the embodiments of the present disclosure, and it is obvious that the embodiments described are only some embodiments of the present disclosure, rather than all embodiments. On the basis of the embodiments in the present disclosure, all other embodiments, which can be obtained by one of ordinary skill in the art without making creative efforts, shall fall within the scope of protection of the present disclosure. The technical solutions of the present disclosure are variously described below in conjunction with various drawings and embodiments.

"First" and "second" hereinafter are used only for descriptive distinction and have no other special meanings.

In the related art known by the inventors, vision guiding a robot needs calibration of a relationship between a camera coordinate system and a world coordinate system for the robot; for a six-degree-of-freedom robot, the calibration may be made by means of hand-eye calibration or the like, while for a four-degree-of-freedom robot with only rotation around a z-axis, a rotation matrix for the four-degree-of-freedom robot cannot be obtained by means of the existing hand-eye calibration. Since a rotation matrix R and a translation matrix T for the four-degree-of-freedom robot cannot be obtained by means of the existing hand-eye calibration for the six-degree-of-freedom robot, the existing hand-eye calibration for the six-degree-of-freedom robot is not applicable to the four-degree-of-freedom robot.

In view of this, one technical problem to be solved by the present disclosure is to provide a coordinate system calibration method, apparatus and system for a robot, and a storage medium, in which a calibration board is arranged parallel to a corresponding coordinate plane of a world coordinate system, and in a process of controlling an execution component of the robot to perform translation movement, first coordinate information of the execution component and second coordinate information which is collected by a photographic apparatus regarding the calibration board are acquired, so as to determine a rotation matrix; and the execution component is controlled to perform rotatory movement, and third coordinate information which is collected by the photographic apparatus is acquired, so as to determine a translation matrix; by arranging the calibration board and performing automated data acquisition and calculation, the rotation matrix and the translation matrix can be respectively solved, so that automated calibration for the four-freedom-degree robot is achieved, and the calibration operation is simple and convenient, and the calibration result is accurate, without the need for manual adjustment, applicability and robustness are good, and user's use experience is improved.

FIG. 1 is a schematic flow diagram of some embodiments of a coordinate system calibration method for a robot according to the present disclosure, as shown in FIG. 1:

step 101, controlling an execution component of the robot to perform translation movement, and acquiring first coordinate information of the execution component which corresponds to the translation movement.

In some embodiments, the execution component of the robot is a tool such as a robotic arm. The robot is a four-degree-of-freedom robot, which refers to a robot whose execution component can move along X, Y and Z axes of a world coordinate system and can rotate around the Z axis of the world coordinate system, namely, the execution component has only one rotation direction.

The execution component is controlled to perform translation movement by a control means of the robot, and the first coordinate information of the execution component which corresponds to the translation movement is acquired, wherein the first coordinate information is coordinate information in the world coordinate system, namely the first coordinate information is X, Y and Z-axis coordinates of the execution component in the world coordinate system.

Step 102, acquiring second coordinate information which is collected by a photographic apparatus of the robot regarding a calibration board.

In some embodiments, automated data collection and result solving are achieved by using a calibration board with specific mounting requirements. The calibration board is parallel to a corresponding coordinate plane of the world coordinate system, for example, the calibration board is parallel to an XOY coordinate plane in the world coordinate system, where O is an origin of the world coordinate system.

The photographic apparatus of the robot may be a 3D camera or the like in a vision system, and the second coordinate information is coordinate information in a camera coordinate system, that is, the second coordinate information is X, Y and Z-axis coordinates of the calibration board in the camera coordinate system that are determined on the basis of an image of the calibration board, which is photographed by the 3D camera in the progress of controlling the execution component of the robot to perform translation movement.

Figure 2:
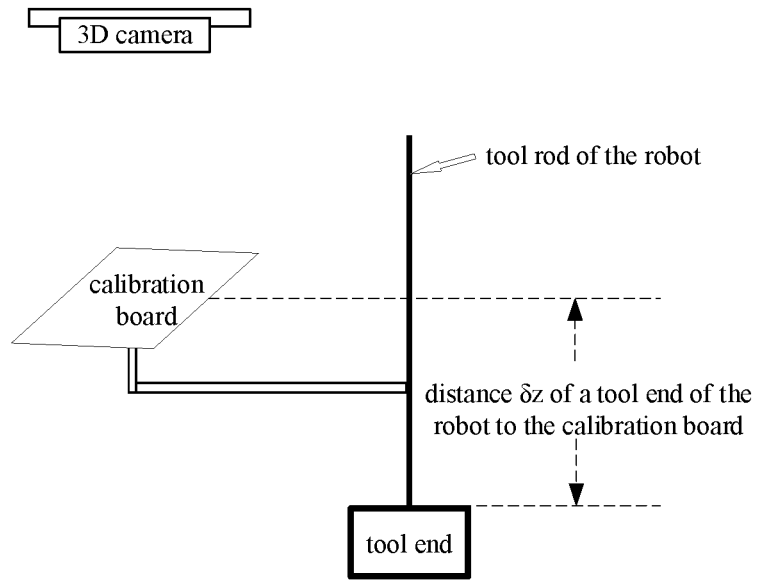
FIG. 2 is a schematic diagram of arrangement of a calibration board.

As shown in FIG. 2, the calibration board is a specifically designed calibration board, a board surface (plane) of the mounted calibration board is perpendicular to a tool rod of the four-degree-of-freedom robot, i.e. perpendicular to the z-axis in the world coordinate system of the four-degree-of-freedom robot, and a distance δz of a tool end (the tool may be the execution component, etc.) of the robot to the board surface of the calibration board can ensure accuracy. A reference point is determined on the calibration board, and second coordinate information which is collected by the 3D camera of the robot regarding the reference point is acquired. For example, the calibration board is provided with black and white grids, and the second coordinate information of the reference point is collected by taking an intersection point of one or more grids as the reference point.

Step 103, determining a rotation matrix on the basis of the first coordinate information and the second coordinate information.

Step 104, controlling the execution component to perform rotatory movement, and acquiring third coordinate information which is collected by the photographic apparatus regarding the calibration board.

In some embodiments, the execution component of the four-degree-of-freedom robot is controlled to move only around the Z axis of the world coordinate system, and in the process of controlling the execution component to perform rotatory movement, third coordinate information which is collected by the photographic apparatus regarding the reference point on the calibration board is acquired, wherein the third coordinate information is coordinate information of the calibration board in the camera coordinate system.

Step 105, according to a position relation between the calibration board and the execution component, determining a deviation vector between the calibration board and the execution component.

In some embodiments, the position relation comprises a perpendicular distance δz between an XOY coordinate plane in the world coordinate system where an end of the execution component of the robot is located and the calibration board plane. The perpendicular distance dz between the calibration board and the corresponding coordinate plane of the world coordinate system is acquired, and a deviation vector is constructed on the basis of the perpendicular distance dz and direction information of an axis of the world coordinate system.

Step 106, determining a translation matrix on the basis of the first coordinate information, the deviation vector, the rotation matrix, and the third coordinate information.

Figure 3:
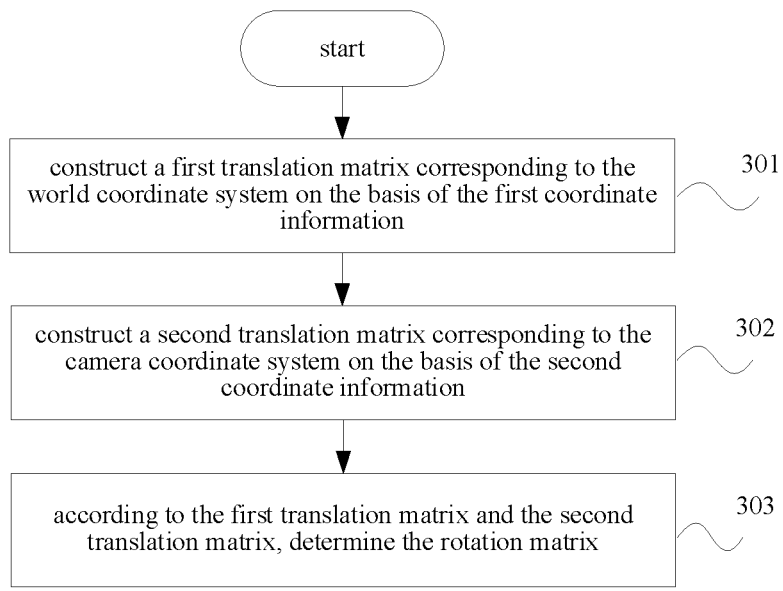
FIG. 3 is a schematic flow diagram of determining a rotation matrix in some embodiments of a coordinate system calibration method for a robot according to the present disclosure.

The rotation matrix may be determined on the basis of the first coordinate information and the second coordinate information in various manners. FIG. 3 is a schematic flow diagram of determining a rotation matrix in some embodiments of a coordinate system calibration method for a robot according to the present disclosure, as shown in FIG. 3:

step 301, constructing a first translation matrix corresponding to the world coordinate system on the basis of the first coordinate information.

Step 302, constructing a second translation matrix corresponding to the camera coordinate system on the basis of the second coordinate information.

Step 303, according to the first translation matrix and the second translation matrix, determining the rotation matrix.

The rotation matrix may be determined according to the first translation matrix and the second translation matrix in various manners. For example, three-dimensional affine transformation processing is performed on the basis of the first translation matrix and the second translation matrix, so as to determine the rotation matrix.

In some embodiments, in the process of the collection of the calibration data, transformation between the world coordinate system corresponding to the execution component of the robot and the camera coordinate system (calibration board coordinate system) is needed. A hand-eye calibration calculation approach for the six-degree-of-freedom robot can be simplified to solve the following equation:

$$R^W R = R R^C; \qquad (1\text{-}1)$$

$$R^W T + T^W = R T^C + T; \qquad (1\text{-}2)$$

where $R^W$ is a rotation matrix (for example, a 3×3 matrix) relative to an initial collection position in the world coordinate system, and $T^W$ is a translation matrix (for example, a 3×1 matrix) relative to the initial collection position in the world coordinate system; $R^C$ and $T^C$ are a rotation matrix and a translation matrix relative to the initial collection position in the camera coordinate system, respectively; and R and T are a rotation matrix and a translation matrix between the camera coordinate system and the world coordinate system that are to be solved.

By using a conjugate relationship of the rotation matrix and the rotation vector representation, the equation (1-1) is equivalent to the following relationship:

$$Rk^C = k^W; \qquad (1\text{-}3)$$

where $k^C$ and $k^W$ respectively are rotation vectors corresponding to $R^C$ and $R^W$ (whose vector direction represents a rotation axis direction, and whose vector length represents a rotation angle).

Solving the equation (1-3) needs at least collecting four sets of data, and assuming that N+1 (N≥3) sets of hand-eye calibration data are collected, the following relationship can be constructed by the equation (1-3):

$$R\left[k_1^C, k_2^C, k_3^C \ldots k_N^C\right] = \left[k_1^W, k_2^W, k_3^W \ldots k_N^W\right]; \qquad (1\text{-}4)$$

let matrices $M_1 = [k_1^C, k_2^C, k_3^C \ldots k_N^C]$ and $M_2 = [k_1^W, k_2^W, k_3^W \ldots k_N^W]$, then:

$$RM_1 = M_2; \qquad (1\text{-}5)$$

A parameter $\lambda_1$ is a value representing a magnitude relationship between ks. For the four-degree-of-freedom robot, since the execution component of the robot only rotates around the z-axis, all data satisfy $k_1^C = \lambda_1 k_2^C = \lambda_2 k_3^C \ldots = \lambda_{N-1} k_N^C$ and $k_1^W = \lambda_1 k_2^W = \lambda_2 k_3^W \ldots \lambda_{N-1} k_N^W$, that is, for different collection positions, rotation transformations between the world coordinate system and the camera coordinate system only differ in the rotation angles, but have the same rotation axis direction, so that a rank of the matrices $M_1$ and $M_2$ is 1, and a correct rotation matrix R cannot be obtained by solving (1-5).

As can be seen from the above, although the automated calibration for the six-degree-of-freedom robot can be achieved by means of existing hand-eye calibration, for the the four-degree-of-freedom robot (the movement of the end of the execution component of the robot only includes spatial translation and rotation around the z axis), the hand-eye calibration result cannot be solved by means of the existing hand-eye calibration.

Although the hand-eye calibration of the rotation matrix of the four-degree-of-freedom robot cannot be solved by using the equation (1-1) or (1-3), it can be found by observing the equation (1-2) that if it is required that, an initial position posture of the end of the robot is kept unchanged in the whole data collection process, then $R^W = I$, hence the equation (1-2) can be simplified to:

$$RT^C = T^W; \qquad (1\text{-}6)$$

where $T^W$ is a first translation matrix corresponding to the world coordinate system, and $T^C$ is a second translation matrix corresponding to the camera coordinate system.

Multiple sets (at least three sets) of $T^W$ and $T^C$ are acquired. For example:

$$T^C = \begin{bmatrix} 171.36 \\ -1227.75 \\ 2324.84 \end{bmatrix},$$

$$T^W = \begin{bmatrix} -193.23 \\ -1279.24 \\ -2295.17 \end{bmatrix}.$$

Three-dimensional affine transformation processing is performed on the basis of the multiple sets of $T^W$ and $T^C$, so as to determine the rotation matrix R. For example, the rotation matrix R may be determined by using an estimatedAffine3D function of OpenCV and performing three-dimensional affine transformation processing on the basis of the multiple sets of $T^W$ and $T^C$, which can ensure orthogonality of the rotation matrix R. For example, the determined rotation matrix R is:

$$\begin{bmatrix} -0.9989 & 0.0451 & 0.0143 \\ 0.0447 & 0.9987 & -0.0262 \\ -0.0155 & -0.0255 & -0.9996 \end{bmatrix}.$$

In addition, the equation (1-6) can be subjected to matrix transposition and transformed to $(T^C)^t R^t = (T^W)^t$, which can be solved by using singular value decomposition.

As can be seen from the above, the calculation process of the calibration can be divided into two steps: a first step of fixing an end posture of the execution component of the robot, only controlling the execution component of the robot to perform translation movement, collecting a sufficient quantity of data (N≥4), and calculating the rotation matrix R between the camera coordinate system and a robot coordinate system (the world coordinate system) by using the equation (1-6); and a second step of collecting other data for the calculation of the translation matrix T of the two coordinate systems.

Figure 4:
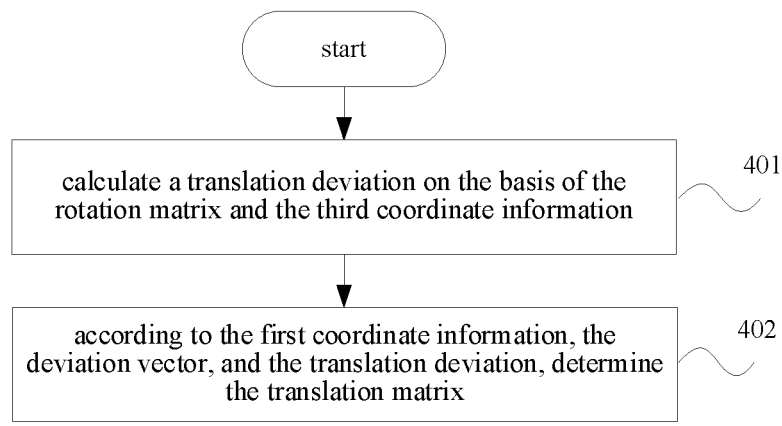
FIG. 4 is a schematic flow diagram of determining a translation matrix in some embodiments of a coordinate system calibration method for a robot according to the present disclosure.

The translation matrix can be determined on the basis of the first coordinate information, the deviation vector, the rotation matrix, and the third coordinate information in various manners. FIG. 4 is a schematic flow diagram of determining a translation matrix in some embodiments of a coordinate system calibration method for a robot according to the present disclosure, as shown in FIG. 4:

step 401, calculating a translation deviation on the basis of the rotation matrix and the third coordinate information. For example, a product of the rotation matrix and the third coordinate information is calculated as the translation deviation.

Step 402, according to the first coordinate information, the deviation vector, and the translation deviation, determining the translation matrix. For example, coordinate information of the calibration board is determined on the basis of a sum of the first coordinate information and the deviation vector, and according to a difference between the coordinate information of the calibration board and the translation deviation, the translation matrix is determined.

In some embodiments, after collecting the data for calibrating the rotation matrix R, two sets of data are collected: collecting one set of data at a certain position (or using a last set of data collected for calibrating the rotation matrix R), then controlling the end of the execution component of the robot not to perform translation movement but to perform 180° (or 90° and the like) rotation, and collecting one set of data after the rotation is finished. Using the two sets of data, the translation matrix T is calculated in combination with point cloud data provided by the camera.

Because the four-degree-of-freedom robot only rotates around the z axis, and there is a 180° rotation relationship between the two sets of data, for two sets of spatial positions of a same reference point on the calibration board, their center point is necessarily on an axis (rotation axis) parallel to the z axis of the world coordinate system of the robot, coordinates regarding the same reference point are extracted from point clouds of the two sets of data, and a coordinate (in the camera coordinate system) of their center point is calculated; and by using the coordinate of the end of the execution component of the robot in the world coordinate system of the robot when the data is collected and the distance dz of the end of the execution component of the robot to the calibration board, the translation matrix T between the camera coordinate system and the world coordinate system is solved.

Assuming that the coordinate of the center point of the positions collected for the same reference point twice on the calibration board is X, and the coordinate of the end of the execution component of the robot when the data is collected is Y, T is calculated by the following relation:

$$T = Y + \Delta Y - RX; \quad (1\text{-}7)$$

$$\Delta Y = \begin{bmatrix} 0 \\ 0 \\ \delta z \end{bmatrix},$$

where namely $\Delta Y$ is the deviation vector, $\delta z$ is the perpendicular distance between the calibration board and the corresponding coordinate plane of the world coordinate system; R is the rotation matrix calculated in the first step, RX is the translation deviation, X is the third coordinate information, Y is the first coordinate information, namely Y is the last set of first coordinate information which is collected for calibrating the rotation matrix R, and Y+$\Delta Y$ is the coordinate information of the calibration board, namely Y+$\Delta Y$ is the coordinate information of the center point of the positions collected for the same reference point twice on the calibration board in the world coordinate system.

For example, when the four-degree-of-freedom robot is calibrated, a customized calibration board is mounted. A posture of the end of the execution component of the robot is fixed, the execution component of the robot is controlled to perform translation movement, and by using random translation movement, N (N≥4) sets of data are automatically collected, denoted as data A; one set of data is collected at a certain position, the translation movement of the end of the execution component of the robot is fixed, the execution component is controlled to perform rotatory movement and 180° rotation, and a second set of data is collected, denoted as data B.

By using the data A, a rotation matrix R between the camera coordinate system and the world coordinate system is calculated by using the equation (1-6); by using the data B, a position of a calibration board grid point in the two sets of data is calculated; and by using point cloud data in the data B, a coordinate of a center point of same grid points in the two sets of data is calculated, and a translation matrix T between the camera coordinate system and the world coordinate system is calculated by using the equation (1-7).

Figure 5:
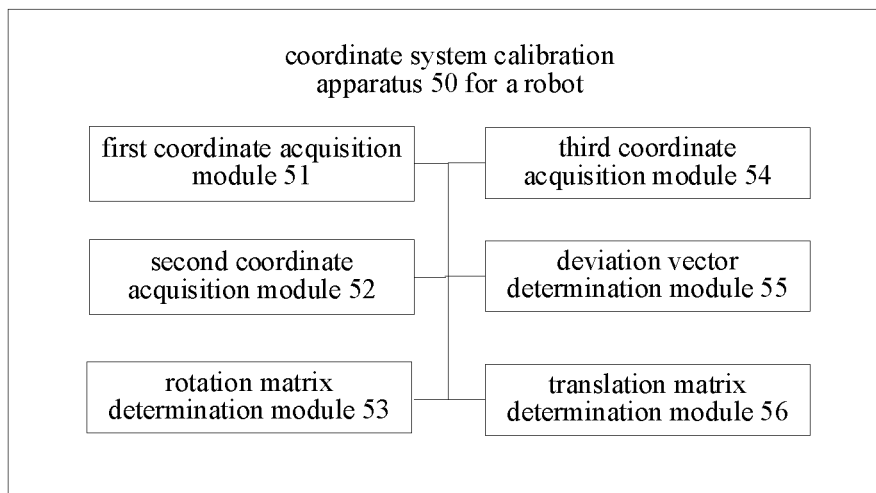
FIG. 5 is a schematic module diagram of some embodiments of a coordinate system calibration apparatus for a robot according to the present disclosure.

In some embodiments, as shown in FIG. 5, the present disclosure provides a coordinate system calibration apparatus 50 for a robot, comprising a first coordinate acquisition module 51, a second coordinate acquisition module 52, a rotation matrix determination module 53, a third coordinate acquisition module 54, a deviation vector determination module 55, and a translation matrix determination module 56.

The first coordinate acquisition module 51 controls an execution component of the robot to perform translation movement, and acquires first coordinate information of the execution component which corresponds to the translation movement, wherein the robot is a four-degree-of-freedom robot, and the first coordinate information is coordinate information in a world coordinate system. The second coordinate acquisition module 52 acquires second coordinate information which is collected by a photographic apparatus of the robot regarding a calibration board, wherein the calibration board is parallel to a corresponding coordinate plane of the world coordinate system, and the second coordinate information is coordinate information in a camera coordinate system. The rotation matrix determination module 53 determines a rotation matrix on the basis of the first coordinate information and the second coordinate information.

The third coordinate acquisition module 54 controls the execution component to perform rotatory movement, and acquires third coordinate information which is collected by the photographic apparatus regarding the calibration board, wherein the third coordinate information is coordinate information in the camera coordinate system. The deviation vector determination module 55 determines, according to a position relation between the calibration board and the execution component, a deviation vector between the calibration board and the execution component. The translation matrix determination module 56 determines a translation matrix on the basis of the first coordinate information, the deviation vector, the rotation matrix, and the third coordinate information.

In some embodiments, the second coordinate acquisition module 52 determines a reference point on the calibration board, and acquires second coordinate information which is collected by the photographic apparatus regarding the reference point. The deviation vector determination module 55 acquires a perpendicular distance between the calibration board and the corresponding coordinate plane of the world coordinate system, and constructs the deviation vector on the basis of the perpendicular distance and direction information of an axis of the world coordinate system.

Figure 6:
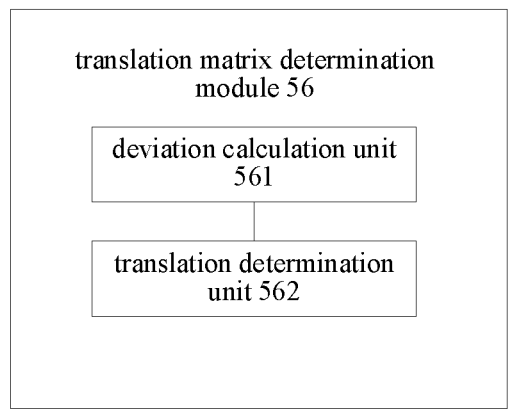
FIG. 6 is a schematic module diagram of some embodiments of a coordinate system calibration apparatus for a robot according to the present disclosure.

As shown in FIG. 6, the translation matrix determination module 56 comprises a deviation calculation unit 561 and a translation determination unit 562. The deviation calculation unit 561 calculates a translation deviation on the basis of the rotation matrix and the third coordinate information. The translation determination unit 562 determines the translation matrix, according to the first coordinate information, the deviation vector, and the translation deviation.

For example, the deviation calculation unit 561 calculates a product of the rotation matrix and the third coordinate information as the translation deviation. The translation determination unit 562 determines coordinate information of the calibration board on the basis of a sum of the first coordinate information and the deviation vector, and according to a difference between the coordinate information of the calibration board and the translation deviation, determines the translation matrix.

Figure 7:
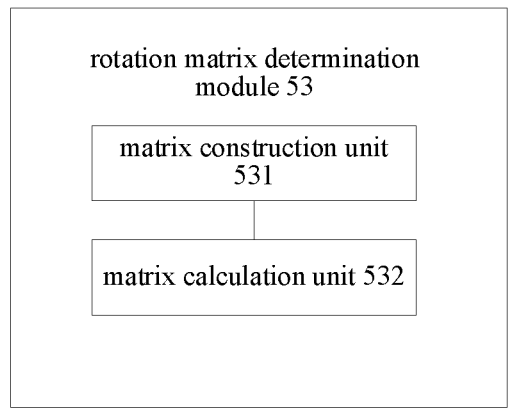
FIG. 7 is a schematic module diagram of some embodiments of a coordinate system calibration apparatus for a robot according to the present disclosure.

In some embodiments, as shown in FIG. 7, the rotation matrix determination module 53 comprises a matrix construction unit 531 and a matrix calculation unit 532. The matrix construction unit 531 constructs a first translation matrix corresponding to the world coordinate system on the basis of the first coordinate information, and constructs a second translation matrix corresponding to the camera coordinate system on the basis of the second coordinate information. The matrix calculation unit 532 determines the rotation matrix, according to the first translation matrix and the second translation matrix. For example, the matrix calculation unit 532 performs three-dimensional affine transformation processing on the basis of the first translation matrix and the second translation matrix, so as to determine the rotation matrix.

Figure 8:
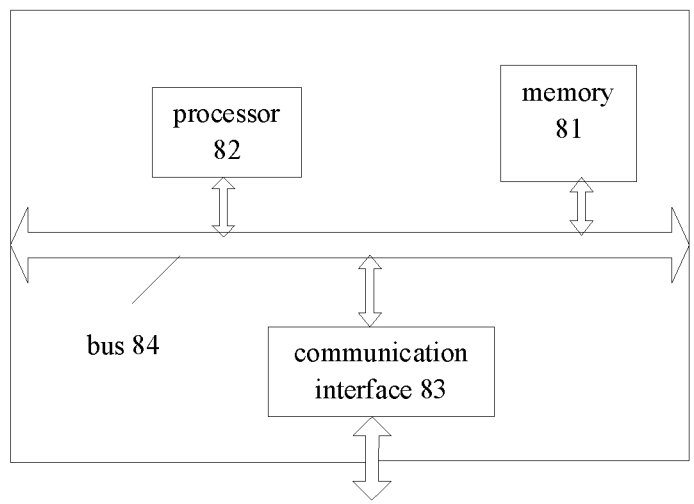
FIG. 8 is a schematic module diagram of other embodiments of a coordinate system calibration apparatus for a robot according to the present disclosure.

FIG. 8 is a schematic module diagram of other embodiments of a coordinate system calibration apparatus for a robot according to the present disclosure. As shown in FIG. 8, the apparatus may comprise a memory 81, a processor 82, a communication interface 83, and a bus 84. The memory 81 is used for storing instructions, the processor 82 is coupled to the memory 81, and the processor 82 is configured to perform, on the basis of the instructions stored in the memory 81, the above coordinate system calibration method for a robot.

The memory 81 may be a high-speed RAM memory, a non-volatile memory, or the like, and the memory 81 may also be a memory array. The memory 81 might also be partitioned into blocks, and the blocks may be combined into virtual volumes according to certain rules. The processor 82 may be a central processing unit (CPU), or an application specific integrated circuit (ASIC), or one or more integrated circuits configured to implement the coordinate system calibration method for a robot of the present disclosure.

In some embodiments, the present disclosure provides a coordinate system calibration system, comprising a calibration board, the coordinate system calibration apparatus for a robot in any of the above embodiments.

In some embodiments, the present disclosure provides a computer-readable storage medium, having thereon stored computer instructions which, when executed by a processor, implement the coordinate system calibration method for a robot in any of the above embodiments.

The computer-readable storage medium may take any combination of one or more readable media. The readable medium may be a readable signal medium or a readable storage medium. A readable storage medium may include, for example, but is not limited to, an electronic, magnetic, optical, electromagnetic, infrared, or semiconductor system, apparatus, or device, or a combination of any of the foregoing. More specific examples (a non-exhaustive list) of the readable storage medium may include: an electrical connection having one or more wires, a portable diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to the coordinate system calibration method, apparatus and system for a robot, and the storage medium in the above embodiments, a calibration board is arranged parallel to a corresponding coordinate plane of a world coordinate system, and in a process of controlling an execution component of the robot to perform translation movement, first coordinate information of the execution component and second coordinate information which is collected by a photographic apparatus regarding the calibration board are acquired, so as to determine a rotation matrix; the execution component is controlled to perform rotatory movement, and third coordinate information which is collected by the photographic apparatus is acquired, so as to determine a translation matrix; by arranging the calibration board and performing automated data collection and calculation, the rotation matrix and the translation matrix can be solved respectively, so that automated calibration for the four-freedom-degree robot is achieved, the calibration operation is simple and convenient, and the calibration result is accurate, without the need for manual adjustment, applicability and robustness are good, and user's use experience is improved.

The basic principles of the present disclosure have been described above in conjunction with specific embodiments, but it should be noted that advantages, benefits, effects, and the like, mentioned in the present disclosure are only examples and not limitations, and cannot be considered essential to the various embodiments of the present disclosure. As will be appreciated by those skilled in the art, the embodiments of the present disclosure may be provided as a method, system, or computer program product. Accordingly, the present disclosure may take a form of an entire hardware embodiment, an entire software embodiment or an embodiment combining software and hardware aspects. Furthermore, the present disclosure may take a form of a computer program product implemented on one or more computer-usable non-transitory storage media (including, but not limited to, a disk memory, CD-ROM, optical memory, etc.) having computer-usable program code embodied therein.

The present disclosure is described with reference to flow diagrams and/or block diagrams of the method, device (system) and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions may be provided to a processor of a general-purpose computer, special-purpose computer, embedded processor, or other programmable data processing devices to produce a machine, such that the instructions which are executed through the processor of the computer or other programmable data processing devices create means for implementing the functions specified in one or more flows of the flow diagrams and/or one or more blocks of the block diagrams.

These computer program instructions may also be stored in a computer-readable memory that can guide a computer or other programmable data processing devices to work in a specific manner, such that the instructions stored in the computer-readable memory produce an article of manufacture including instruction means which implement the functions specified in one or more flows of the flow diagrams and/or one or more blocks of the block diagrams.

The method and system of the present disclosure might be implemented in a number of ways. The method and system of the present disclosure may be implemented, for example, by software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure may further be implemented as programs recorded in a recording medium, the programs including machine-readable instructions for implementing the method according to the present disclosure. Therefore, the present disclosure further covers a recording medium storing a program for performing the method according to the present disclosure.

The description of the present disclosure has been presented for purposes of examples and description, and is not intended to be exhaustive or limit this disclosure to the form disclosed. Many modifications and variations are apparent to one of ordinary skill in the art. The selection and description of the embodiments are to better explain the principles and the practical applications of the present disclosure, and to enable one of ordinary skill in the art to understand the present disclosure and therefore design various embodiments with various modifications suitable for a specific purpose.

What is claimed is:

1. A coordinate system calibration method for a robot, comprising:
   controlling an execution component of the robot to perform translational motion, and acquiring first coordinate information of the execution component which corresponds to the translational motion, wherein the robot is a four-degree-of-freedom robot, and the first coordinate information is coordinate information in a world coordinate system;
   acquiring second coordinate information which is collected by a photographic apparatus of the robot regarding a calibration board, wherein the calibration board is parallel to a corresponding coordinate plane of the world coordinate system, and the second coordinate information is coordinate information in a camera coordinate system;
   determining a rotation matrix on the basis of the first coordinate information and the second coordinate information;
   controlling the execution component to perform rotational motion, and acquiring third coordinate information which is collected by the photographic apparatus regarding the calibration board, wherein the third coordinate information is coordinate information in the camera coordinate system;
   determining a deviation vector between the calibration board and the execution component according to a position relation between the calibration board and the execution component; and
   determining a translation matrix on the basis of the first coordinate information, the deviation vector, the rotation matrix, and the third coordinate information.

2. The coordinate system calibration method according to claim 1, wherein the determining a translation matrix on the basis of the first coordinate information, the deviation vector, the rotation matrix, and the third coordinate information comprises:
   calculating a translation deviation on the basis of the rotation matrix and the third coordinate information; and
   determining the translation matrix according to the first coordinate information, the deviation vector, and the translation deviation.

3. The coordinate system calibration method according to claim 2, wherein the calculating a translation deviation on the basis of the rotation matrix and the third coordinate information comprises:
   calculating a product of the rotation matrix and the third coordinate information as the translation deviation; and
   the determining the translation matrix according to the first coordinate information, the deviation vector, and the translation deviation comprises:
   determining coordinate information of the calibration board on the basis of a sum of the first coordinate information and the deviation vector; and
   determining the translation matrix according to a difference between the coordinate information of the calibration board and the translation deviation.

4. The coordinate system calibration method according to claim 1, wherein the determining a deviation vector between the calibration board and the execution component according to a position relation between the calibration board and the execution component comprises:
   acquiring a perpendicular distance between the calibration board and the corresponding coordinate plane of the world coordinate system; and
   constructing the deviation vector on the basis of the perpendicular distance and direction information of an axis of the world coordinate system.

5. The coordinate system calibration method according to claim 1, wherein the determining a rotation matrix on the basis of the first coordinate information and the second coordinate information comprises:
   constructing a first translation matrix corresponding to the world coordinate system on the basis of the first coordinate information;
   constructing a second translation matrix corresponding to the camera coordinate system on the basis of the second coordinate information; and
   determining the rotation matrix according to the first translation matrix and the second translation matrix.

6. The coordinate system calibration method according to claim 5, wherein the determining the rotation matrix according to the first translation matrix and the second translation matrix comprises:
   performing three-dimensional affine transformation processing on the basis of the first translation matrix and the second translation matrix, to determine the rotation matrix.

7. The coordinate system calibration method according to claim 1, wherein the acquiring second coordinate information which is collected by a photographic apparatus of the robot regarding a calibration board comprises:
   determining a reference point on the calibration board; and
   acquiring second coordinate information which is collected by the photographic apparatus regarding the reference point.

8. A coordinate system calibration apparatus for a robot, comprising:
   a processor; and
   a memory coupled to the processor, storing program instructions which, when executed by the processor, cause the processor to:
   control an execution component of the robot to perform translation movement, and acquire first coordinate information of the execution component which corresponds to the translation movement, wherein the robot is a four-degree-of-freedom robot, and the first coordinate information is coordinate information in a world coordinate system;
acquire second coordinate information which is collected by a photographic apparatus of the robot regarding a calibration board, wherein the calibration board is parallel to a corresponding coordinate plane of the world coordinate system, and the second coordinate information is coordinate information in a camera coordinate system;
determine a rotation matrix on the basis of the first coordinate information and the second coordinate information;
control the execution component to perform rotatory movement, and acquire third coordinate information which is collected by the photographic apparatus regarding the calibration board, wherein the third coordinate information is coordinate information in the camera coordinate system;
determine a deviation vector between the calibration board and the execution component according to a position relation between the calibration board and the execution component; and
determine a translation matrix on the basis of the first coordinate information, the deviation vector, the rotation matrix, and the third coordinate information.

9. A coordinate system calibration system, comprising:
a calibration board; and
the coordinate system calibration apparatus for a robot according to claim 8.

10. The coordinate system calibration apparatus according to claim 8, wherein the determining a translation matrix on the basis of the first coordinate information, the deviation vector, the rotation matrix, and the third coordinate information comprises:
calculating a translation deviation on the basis of the rotation matrix and the third coordinate information; and
determining the translation matrix according to the first coordinate information, the deviation vector, and the translation deviation.

11. The coordinate system calibration apparatus according to claim 10, wherein the calculating a translation deviation on the basis of the rotation matrix and the third coordinate information comprises:
calculating a product of the rotation matrix and the third coordinate information as the translation deviation; and
the determining the translation matrix according to the first coordinate information, the deviation vector, and the translation deviation comprises:
determining coordinate information of the calibration board on the basis of a sum of the first coordinate information and the deviation vector; and
determining the translation matrix according to a difference between the coordinate information of the calibration board and the translation deviation.

12. The coordinate system calibration apparatus according to claim 8, wherein the determining a deviation vector between the calibration board and the execution component according to a position relation between the calibration board and the execution component comprises:
acquiring a perpendicular distance between the calibration board and the corresponding coordinate plane of the world coordinate system; and
constructing the deviation vector on the basis of the perpendicular distance and direction information of an axis of the world coordinate system.

13. The coordinate system calibration apparatus according to claim 8, wherein the determining a rotation matrix on the basis of the first coordinate information and the second coordinate information comprises:
constructing a first translation matrix corresponding to the world coordinate system on the basis of the first coordinate information;
constructing a second translation matrix corresponding to the camera coordinate system on the basis of the second coordinate information; and
determining the rotation matrix according to the first translation matrix and the second translation matrix.

14. The coordinate system calibration apparatus according to claim 13, wherein the determining the rotation matrix according to the first translation matrix and the second translation matrix comprises:
performing three-dimensional affine transformation processing on the basis of the first translation matrix and the second translation matrix, to determine the rotation matrix.

15. The method according to claim 8, wherein the acquiring second coordinate information which is collected by a photographic apparatus of the robot regarding a calibration board comprises:
determining a reference point on the calibration board; and
acquiring second coordinate information which is collected by the photographic apparatus regarding the reference point.

16. The non-transitory computer readable storage medium according to claim 8, wherein the determining a rotation matrix on the basis of the first coordinate information and the second coordinate information comprises:
constructing a first translation matrix corresponding to the world coordinate system on the basis of the first coordinate information;
constructing a second translation matrix corresponding to the camera coordinate system on the basis of the second coordinate information; and
determining the rotation matrix according to the first translation matrix and the second translation matrix.

17. A non-transitory computer-readable storage medium, having thereon stored computer instructions which, when executed by one or more processors, cause the one or more processors to:
control an execution component of the robot to perform translation movement, and acquire first coordinate information of the execution component which corresponds to the translation movement, wherein the robot is a four-degree-of-freedom robot, and the first coordinate information is coordinate information in a world coordinate system;
acquire second coordinate information which is collected by a photographic apparatus of the robot regarding a calibration board, wherein the calibration board is parallel to a corresponding coordinate plane of the world coordinate system, and the second coordinate information is coordinate information in a camera coordinate system;
determine a rotation matrix on the basis of the first coordinate information and the second coordinate information;
control the execution component to perform rotatory movement, and acquire third coordinate information which is collected by the photographic apparatus regarding the calibration board, wherein the third coordinate information is coordinate information in the camera coordinate system;

determine a deviation vector between the calibration board and the execution component according to a position relation between the calibration board and the execution component; and determine a translation matrix on the basis of the first coordinate information, the deviation vector, the rotation matrix, and the third coordinate information.

18. The non-transitory computer readable storage medium according to claim 17, wherein the determining a translation matrix on the basis of the first coordinate information, the deviation vector, the rotation matrix, and the third coordinate information comprises:

calculating a translation deviation on the basis of the rotation matrix and the third coordinate information; and determining the translation matrix according to the first coordinate information, the deviation vector, and the translation deviation.

19. The non-transitory computer readable storage medium according to claim 18, wherein the calculating a translation deviation on the basis of the rotation matrix and the third coordinate information comprises:

calculating a product of the rotation matrix and the third coordinate information as the translation deviation; and the determining the translation matrix according to the first coordinate information, the deviation vector, and the translation deviation comprises:

determining coordinate information of the calibration board on the basis of a sum of the first coordinate information and the deviation vector; and determining the translation matrix according to a difference between the coordinate information of the calibration board and the translation deviation.

20. The non-transitory computer readable storage medium according to claim 17, wherein the determining a deviation vector between the calibration board and the execution component according to a position relation between the calibration board and the execution component comprises:

acquiring a perpendicular distance between the calibration board and the corresponding coordinate plane of the world coordinate system; and constructing the deviation vector on the basis of the perpendicular distance and direction information of an axis of the world coordinate system.

* * * * *